United States Patent [19]

Grise

[11] Patent Number: 4,690,347

[45] Date of Patent: Sep. 1, 1987

[54] SYSTEM FOR TRANSVERSELY ALIGNING A SUBSTRATE

[75] Inventor: Frederick G. J. Grise, Osterville, Mass.

[73] Assignee: Flexwatt Corporation, Canton, Mass.

[21] Appl. No.: 796,012

[22] Filed: Nov. 7, 1985

Related U.S. Application Data

[63] Continuation of Ser. No. 478,080, Mar. 23, 1983, abandoned.

[51] Int. Cl.$^4$ .............................................. B65H 23/032
[52] U.S. Cl. .................................... 242/57.1; 156/514; 156/517
[58] Field of Search ..................... 242/57.1; 226/18–23

[56] References Cited

U.S. PATENT DOCUMENTS

| | | | |
|---|---|---|---|
| 3,085,761 | 4/1963 | Evers | 242/57.1 |
| 3,132,253 | 5/1964 | Sorsen | 242/57.1 X |
| 3,313,461 | 4/1967 | Andersen | 242/57.1 X |
| 3,627,301 | 12/1971 | Benson et al. | 242/57.1 X |
| 4,200,211 | 4/1980 | Yamagishi et al. | 242/57.1 |
| 4,545,718 | 10/1985 | Marshall | 242/57.1 X |

*Primary Examiner*—John M. Jillions

[57] ABSTRACT

A system in which a substrate having a number of longitudinally-extending patterns thereon is slit along longitudinally-extending parallel lines intermediate the patterns so that a longitudinally-extending portion between each pair of patterns may be removed. The substrate, with the portion(s) removed, is then guided between plastic sheets, and the plastic sheets are sealed to each other along the area from which the substrate portion(s) has been removed and along the outside edges of the substrate. The substrate is aligned relative to the slitter using a system that includes a fixed guide roll the axis of which is parallel to and spaced from the slitter and a second guide roll mounted so that its axis is rotatable relative to the axis of the fixed roll in a plane parallel to and about an axis perpendicular to the axis of the fixed guide roll. A sensor intermediate the fixed and second guide rolls senses the transverse position of substrate passing from the second guide roll to the fixed guide roll, and rotates the second guide roll to shift the substrate transversely when transverse misalignment is detected. The gaps in the slitter and guide through which the substrate passes are only slightly thicker than the substrate so as to prevent wrinkling.

8 Claims, 11 Drawing Figures

SYSTEM FOR TRANSVERSELY ALIGNING A SUBSTRATE

This is a continuation of application Ser. No. 478,080, filed Mar. 23, 1983 abandoned.

This invention relates to electric heaters and, more particularly, to systems for manufacturing heaters of the type including a substrate (on which is printed a semiconductor pattern) sandwiched between a pair of sealing sheets.

It is a principal object of the present invention to provide a system for inexpensively and efficiently producing heaters of different widths. Other objects include providing systems that insure proper registration of the various components of the heater.

The invention features, in one aspect thereof, a system in which a substrate having a number of longitudinally-extending patterns thereon is slit along longitudinally-extending parallel lines intermediate the patterns so that a longitudinally-extending portion between each pair of patterns may be removed. The substrate, with the portion(s) removed, is then guided between plastic sheets, and the plastic sheets are sealed to each other along the area from which the substrate portion(s) has been removed and along the outside edges of the substrate.

In a second aspect, the invention features a system for aligning the substrate that includes a fixed guide roll the axis of which is parallel to and spaced from the slitter and a second guide roll mounted so that its axis is rotatable relative to the axis of the fixed roll in a plane parallel to and about an axis perpendicular to the axis of the fixed guide roll. A sensor intermediate the fixed and second guide rolls senses the transverse position of substrate passing from the second guide roll to the fixed guide roll, and rotates the second guide roll to shift the substrate transversely when transverse misalignment is detected.

Preferred embodiments, which may include both aspects, feature also slitters and paper guides the paper substrate gaps in which are only slightly thicker than the substrate so as to prevent wrinkling.

Other objects, features and advantages of the invention will appear from the following detailed description of a preferred embodiment thereof, taken together with the attached drawings in which.

Figure 1:
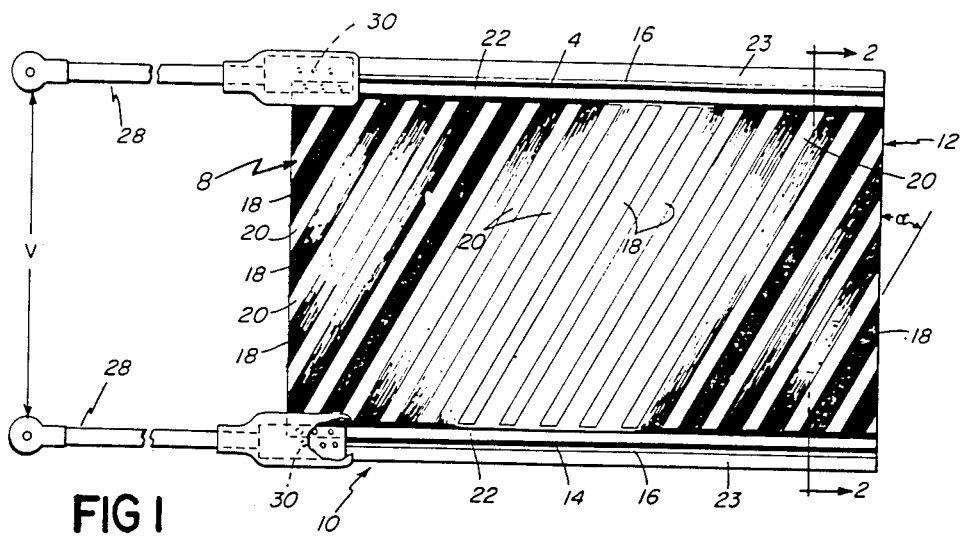
FIG. 1 is a plan view of a heater constructed in accord with the present invention.
Figure 10:
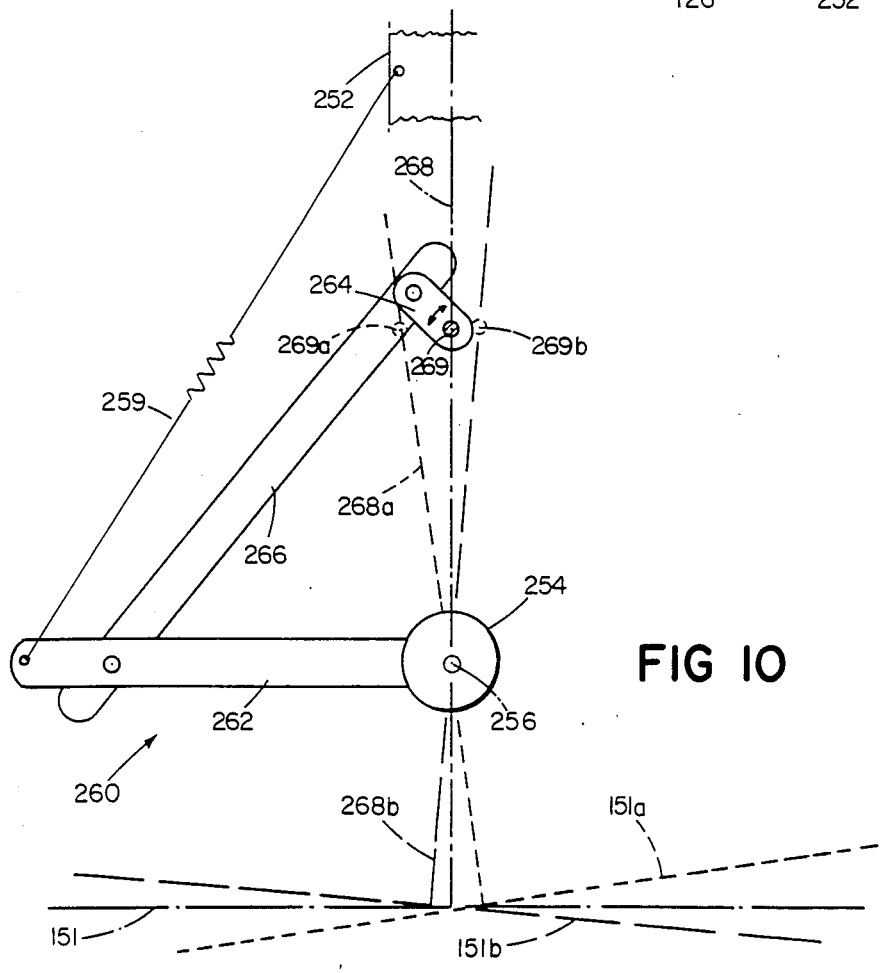
Figure 6:
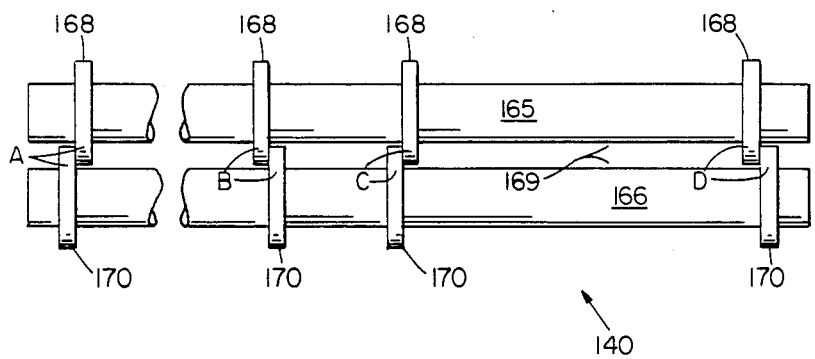
FIG. 6 is a plan view of a paper slitter of the system of FIG. 4.
Figure 11:
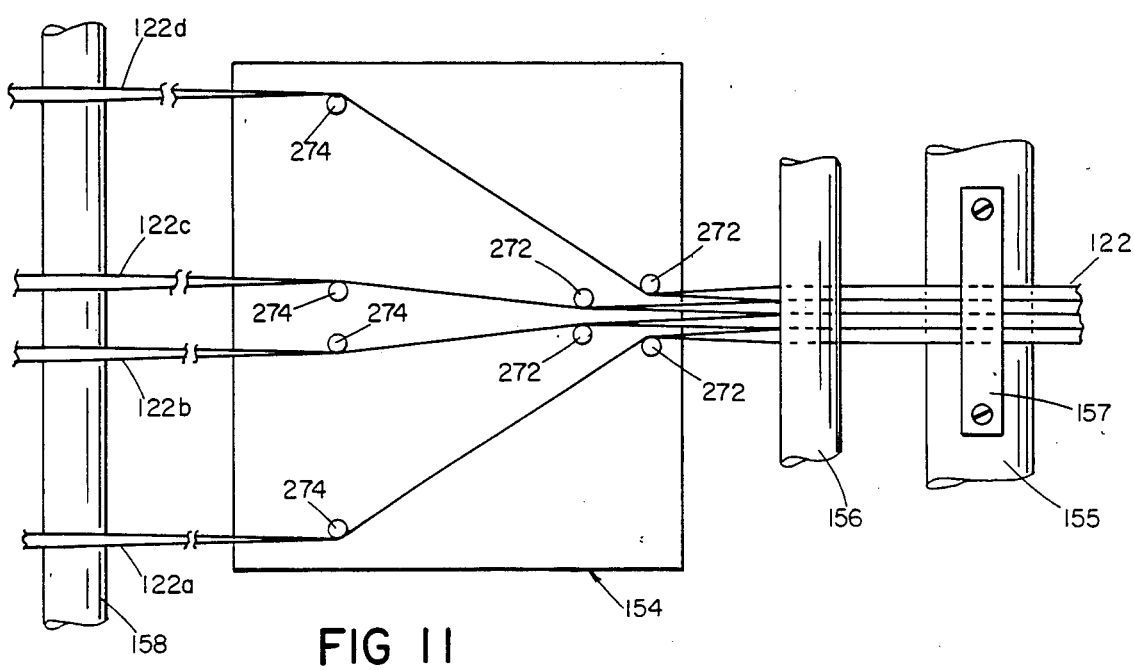
Figure 7:
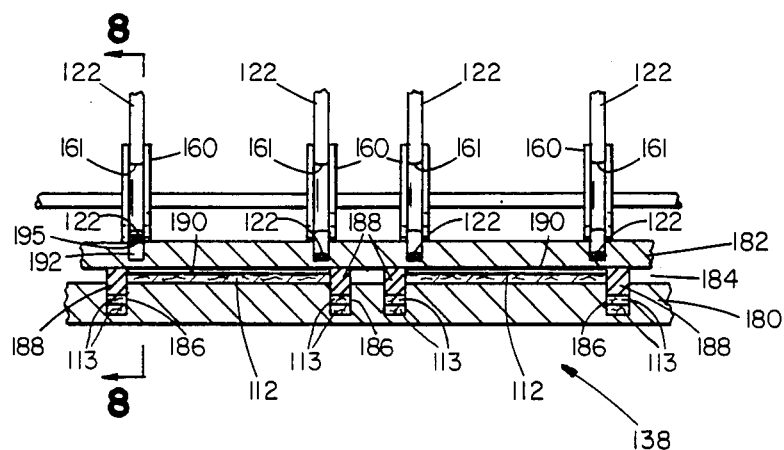
Figure 8:
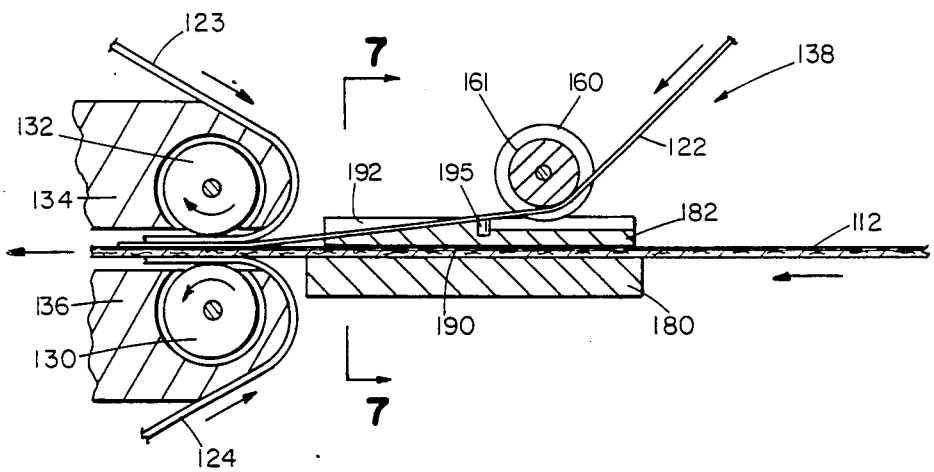
Figure 9:
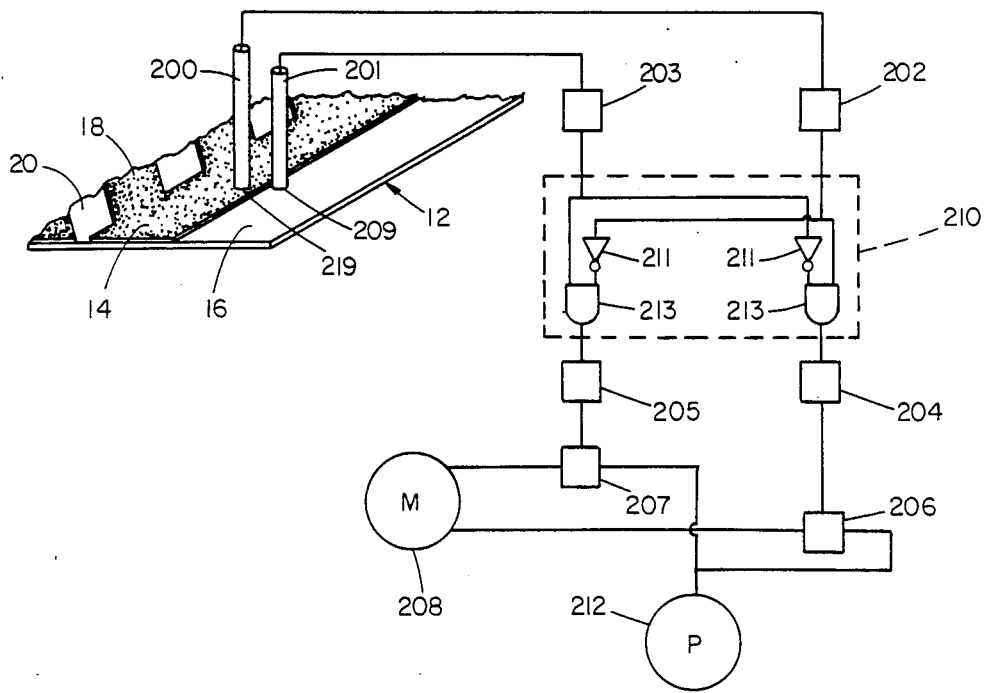

FIGS. 7 and 8 are sectional views of the heater component guides of the system of FIG. 6, taken along lines 8—8 and 7—7 respectively;

FIGS. 9 and 10 are schematic views of the paper alignment system of the system of FIG. 1; and, FIG. 11 is a plan schematic view of the conductor aligner of the system of FIG. 1.

Figure 2:
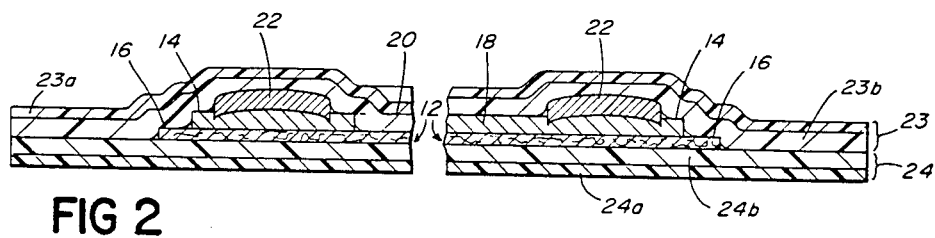
FIG. 2 is a section taken at 2—2 of FIG. 1.
Figure 3:
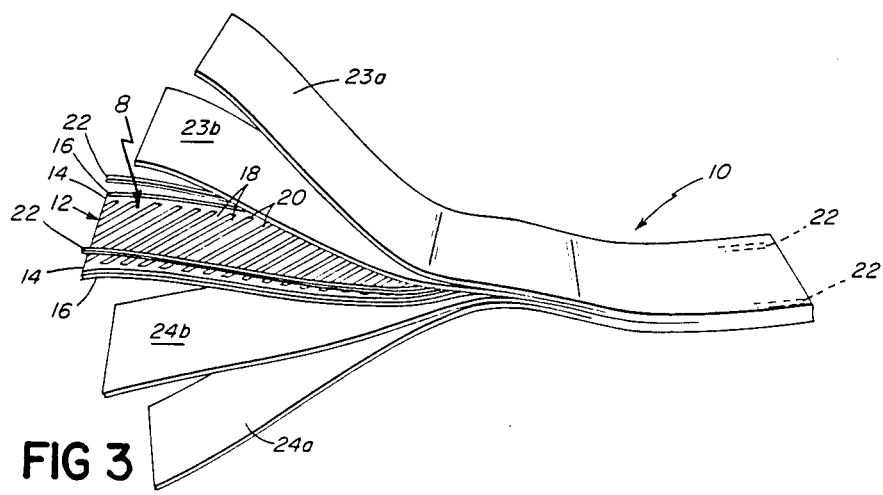
FIG. 3 is partially exploded view of the heater of FIG. 1.

Referring briefly to FIGS. 1-3, there is shown a length of an electrical heater, generally designated 10. Such heaters are described in detail in the assignee's International Publication No. WO 82/00935 and will be described but briefly here.

As shown, the heater 10 comprises a paper substrate 12 (0.0055 in. thick, acid/alkali free, high temperature paper) on which is printed (typically by silk-screen printing) a semi-conductive pattern, generally designated 8, of colloidal graphite (using a colloidal graphite ink produced by Amicon Corportion of Lexington, Mass.). The graphite pattern 8 includes a pair of parallel longitudinal stripes 14 and a plurality of identical regularly-spaced semi-conductor bars 18 extending between stripes. An uncoated boundary 16 of the substrate 12 is provided along each edge of the substrate, on the outside of the respective stripes 14.

A copper electrode 22 is placed on top of each longitudinal stripe 14. Electrodes 22 are slit from thin copper sheets and, as a result, are slightly curved and have sharp "points" along either edge. The electrodes are mounted on stripes 14 with their convex surfaces facing up and the "points" along the edges facing down into and engaging strips 14.

Substrate 12, the graphite pattern 8 printed thereon and electrodes 22 are hemetically sealed between a pair of thin plastic sheets 23, 24. Each of sheets 23, 24 is a co-lamination of a 0.002 in. thick polyester ("Mylar") dielectric insulator 23a, 24a, and a 0.003 in. thick polyethylene binder sheet 23b, 24b. The polyethylene sheets bond well to the graphite-free portions of substrate 12 (both in boundaries 16 and in areas 20 between adjacent bars 18) and to each other. Sheets 23, 24 are wider than substrate 12 and are sealed to each other outside the longitudinal edges of substrate 12, providing the desired hermetric seal.

Electric leads 28 connect heater to a source of power. Each lead includes a crimp-on connector 30 having pins which pierce the plastic sheets 23, 24 and engage one of electrodes 22.

Figure 4:
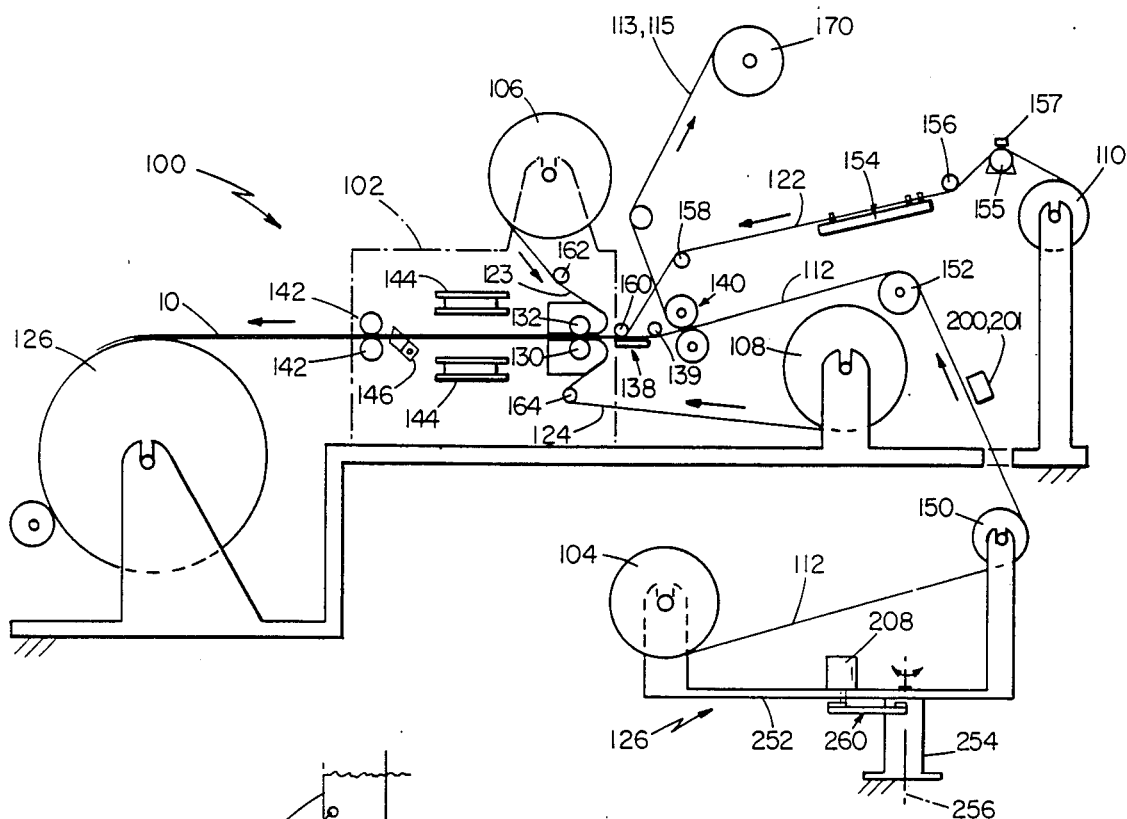
FIG. 4 is a schematic side view, partially in section, of a system embodying the present invention.

The system for manufacturing heater 10, which system is generally designated 100 and is the subject of the instant application, is shown in FIG. 4. System 100 comprises a laminator 102 (as shown a 12 inch Mark I laminator sold by Laminex Inc. Division of A. Rexham Co. of Matthews, N.C.), a paper supply reel 104 which carries the paper 112 on which the semi-conductor patterns 8 have been printed, plastic supply reels 106, 108 which carry, respectively, rolls of the top and bottom plastic sheets 123 and 124, four coaxially-mounted copper supply reels 110, each of which carries a roll of copper conductor 122, and a feed alignment-compensator generally designated 124. As will become evident, system 100 is designed simultaneously to produce two continuous heaters 10.

In the illustrated embodiment, each heater 10 being manufactured is a so-called "four-inch" heater, in which the overall width of the printed semiconductor pattern 8 is four inches. A 1/32 inch wide unprinted border 16 provided along each outside edge of pattern 8, so that the paper substrate 12 of each heater being made has an overall width of 4 1/16 inch. The overall width of the plastic sheets 23, 24 of the heater is five inches, and the sheets being so positioned that a narrow (i.e., 7/32 inch wide) plastic sealed area is provided along one edge of the heater and a wider (i.e., 23/32 inch wide) plastic sealed area is provided along the other edge. The stripes 14 of the printed pattern 8 are 5/32 inch wide, i.e., 1/32 inch wider than the copper electrodes 22. Each bar 18 is ¼ inch wide (measured perpendicularly between its longitudinal edges) and the distance between adjacent bars is ⅛ inch.

Figure 5:
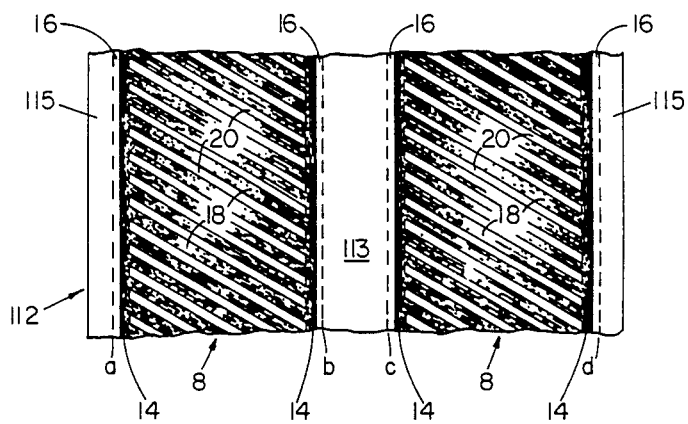
FIG. 5 is a plan view of printed paper used in the system of FIG. 4.

Referring to FIG. 5, the printed paper 112 on roll 114 is 11 inches wide. The two semi-conductor patterns 8 are printed on it, side-by-side and centered. An unprinted portion 113 one and one-half inches wide is provided between the two patterns 8 and an unprinted one inch boundary area 115 is provided along the outside edge of each pattern. The plastic sheets 123, 124 on supply rolls 106, 108 are each 10 inches wide, and the copper strips 122 on copper supply reels are ⅛ inch wide.

Laminator 102 includes a pair of driven, hard-rubber nip rolls 130, 132, each of which is partially surrounded by a respective heater 134, 136. An inlet guide, generally designated 138, and a paper slitter, generally designated 140, are mounted upstream of nip rolls 130, 132. Downstream of the nip rolls are a pair of driven pull rolls 142, a pair of cooling fans 144, and a cutting knife 146. As will be seen, only nip rolls 130, 132 and pull rolls 142 are driven. Conventional shaft brakes (not shown) provide drag on the paper and plastic supply rolls 104, 106, 108; and drag is provided on copper conductors as described hereinafter.

As shown in FIG. 4, the paper 112 from roll 104 passes around guide rolls 150 and 152, through paper slitter 140, around guide roll 139 into the inlet of guide 138, and then into laminator 102. Copper conductors 122 from copper supply reels 110 pass over brake roll 155, under guide bar 156, through a spacing frame, generally designated 154, over guide roll 158, and then under guide rolls 160 at guide 138 into superposition with paper 112. Guide 138 feeds the superposed copper conductors 122 and paper 112 straight into the driven nip rolls 130, 132 of laminator 102.

The plastic sheets 123, 124 from, respectively, guide rolls 106, 108 pass around guides 162, 164 and are then heated by wrapping them about 180 degrees around a respective heater 134, 136 (the heater temperature is between 300 and 310 degrees F.) before passing them between nip rolls 130, 132 in superposition (respectively above and below) with paper 112. The sandwich consisting of (from top to bottom) plastic top sheet 123, copper conductors 122, paper 112 and plastic bottom sheet 124) is compressed by nip rolls 130, 132 to form the desired laminate. The laminate then is drawn by pull rolls 142 between fans 144 and past knife 146 which cuts the the laminate longitudinally in half (i.e., cuts the superposed, sealed plastic sheets 123, 124 along a line midway between the adjacent inner edges of patterns 8. The two halves, each of which comprises a single heater 10, are then wrapped around take-up reel 126.

Nip rolls 130, 132 are geared together and are driven through a one-way clutch. Pull rolls 142 are driven at a speed such that their peripheral velocity is five percent (5%) greater than the peripheral velocity of nip rolls 130, 132. The result is that the sandwich is moved by pull rolls 142 (in the illustrated embodiment at a speed of about 4½ to 5 feet per minute), and the 6 to 8 inch long laminated "sandwich" between nip rolls 130, 132 and pull rolls 142 is held very tight. On start-up, nip rolls 130, 132 initially propel the "sandwich" to pull rolls 142.

Referring now to FIG. 6, slitter 140 comprises a pair of parallel steel rolls 165, 166 with a 0.007 in. gap 169 therebetween, the thickness of the gap (with tolerances) being about 0.001 to 0.002 in. greater than the thickness (0.0055 in.) of paper 112. Slitter 140 includes four sets of cutters, generally designated A-D and each of which comprises a cutting collar 168 on roll 165 and a cooperating cutting collar 170 on roll 166. The axial clearance between the two collars of each set is essentially zero (the maximum permitted clearance is 0.001 in.). Each cutting collar has an outer diameter that is 0.005 to 0.006 in. (i.e., about the thickness of paper 112) greater than the outer diameter of the roll on which it is mounted, so that the adjacent axial faces of two collars 168, 170 of each set will overlap each other. When paper 112 is pulled between rolls 165, 166, the two collars 168, 170 of each set slice it at the axial interface of the collars. In the illustrated embodiment, the four sets of collars are spaced axially along the length of rolls 165, 166 and are arranged so that sets B and C will slice paper 112 along lines b, c (shown in detail in FIG. 5) and remove unprinted portion 113 between the two printed patterns 8, leaving a 1/32 inch wide unprinted borders 16 along the adjacent edges of the pattern. Cutter sets A and D are arranged to cut paper 112 along lines a, d, thereby to trim the outside edges of paper 112, removing most of unprinted portions 115 but leaving the desired 1/32 inch wide unprinted borders 116 along the outside edges of the respective patterns 8. The distance from cutter set A to cutter set B is 4 1/16 inch, that from cutter set B to cutter set C is 1½ inch, and cutter set C is 4 1/16 inch from cutter set D.

Referring again to FIG. 4, the unprinted paper portions 115, 113 cut from paper 112 by slitter 140 are passed upwardly around guide 172 and taken up on one or more waste rolls 174. It will be noted that these portions are removed from paper 112 before the paper 112 enters nip rolls 130, 132 where it is superposed with and between plastic sheets 123, 124. The plastic sheets 123, 124 thus are juxtaposed directly on, and are sealed directly to, each other both in the region between adjacent printed semi-conductor patterns 8 (from which paper portion 113 was removed) and along the outside sides of each pattern 8 (from which paper portions 115 were removed), thus insuring that a heremetric seal is provided along both edges of each completed heater 10.

The construction of inlet guide 138 is most clearly shown in FIGS. 7 and 8. As shown, it comprises a pair of flat plates 180, 182 mounted one above the other with a gap 184 therebetween slightly greater than, but not more than twice, the thickness of paper 112. The thickness of gap 184 is controlled by transverse slots 186 in the lower plate 180, in which are mounted shims 188 the vertical height of which is exactly equal to the depth of the respective slots. Two layers 113 of paper 112 are provided in each slot 186 below its respective shim 188. When the plates 180, 182 are put together, the paper layers slightly compresses, and the resulting thickness (i.e., vertical height) of the gap 184 is greater than the thickness, but less than twice the thickness, of paper 112. Shims 188 also define the side edges of the passages 190 through which the paper 112 is drawn, and the width of each passage 190 is about 0.010 inch greater than the 4 1/16 inch wide of the paper substrate 112 being drawn therethrough.

One principal function of the guide 138 is precisely to register copper conductors 122 relative to the paper substate. As shown, each conductor 122 passes around a respective guide roll 160 into an inclined slot 192, ⅛ inch wide, in the top of guide plate 180. Slot 192 has an upwardly projecting pin 195 at its upper (i.e., nearer to guide roll 160) end. Pin 195 has a diameter of about 1/16 in. and a rounded top that at its center projects about 1/32 inch above the base of slot 190. The base 161 of guide roll 160 is concave. Conductor 122 is under tension and the interaction between the concave base 161 of guide roll 160 and the rounded head of pin 195 insures that the conductor will be upwardly convex in transverse cross section, so that its edges will project downwardly and thus better engage the printed stripes 14 of patterns 8.

Once slots 192 have guided conductors 122 into superposition with the printed longitudinal stripes 16 on paper substrate 12, the conductors and paper are fed between nip rolls 130, 132. The distance between guide 140 and nip rolls 130, 132 is very short, about ½ to ¾ inch, thereby insuring that registration between the conductors and pattern is maintained.

From the foregoing discussion, it should be apparent that it is critical to maintain proper alignment and relative positioning of the semi-conductor patterns 8, slitter 140, and copper conductors 122. Because of the relatively large widths of the heremetric seals between plastic sheets 23 and 24 along the side edges of each heater 10, the precise alignment of the plastic sheets is less critical.

In general, proper alignment and positioning of the components of heaters 10 are provided by alignment compensator 126 and guide 138. Compensator 126 aligns the patterns 8 on paper 112 with slitter 140 so that each paper strip exiting from slitter will include a complete pattern 8 together with the desired 1/32 inch wide unprinted boundary 16 on each side of the pattern. Guide 138 receives the paper strips from slitter 140 and aligns them and conductors 122 relative to each other so that each conductor is properly superposed on a respective longitudinal stripe 14 of a pattern 8.

Referring to FIGS. 4, 9 and 10, alignment compensator 126 includes two fiber optics systems (in the illustrated embodiment Lead Pack II systems sold by Dolan-Jenner Company) each including a fiber optics bundle 200, 201, respectively, and a control board 202, 203 respectively. The output of each control board is connected to a respective trigger relay 204, 205 which in turn controls a respective power relay 206, 207 connected to stepping motor 208 (in the illustrated embodiment a Slosyn-brand motor made by Superior Electric Co.). A system of AND gates 213 and invertors 211, generally designated 210, is provided between control boards 202, 203 and relays 204, 205.

Each fiber optics bundle 200, 201 includes 40 fibers (20 of which are light emitting and 20 of which receive light reflected from paper 112), and the optical lenses 209, 219 of the bundles (each of which is about 0.020 in. in diameter) are positioned midway between guide rolls 150 and 152, closely adjacent the outside edge of a longitudinal stripe 14 of one of the patterns 8 printed on paper 112. The optical lens 219 of bundle 200 is positioned so that, when the paper 112 is properly aligned relative to slitter 140, it receives light reflected from the black printed semi-conductor stripe 14 of the pattern 8. The optical lens 209 of the other bundle 201 is offset (about 0.020 in. transverse to the longitudinal extent of pattern 8 and, for ease in handling, about ½ inch longitudinally of the pattern) so that it receives light reflected from the white unprinted boundary 16 next to the stripe 14. If the paper shifts 0.020 in. in one direction (to the left as viewed in FIG. 9) from its properly aligned position, the lenses of both bundles will overlie and receive light reflected from the white unprinted boundary; if the paper shifts in the other direction (to the right as shown in FIG. 9), the lenses of both bundles will receive light reflected from the black semi-conductor stripe 14.

The output control signals from control boards 202, 203 of the Lead Pack systems depend on whether the lens of the particular system is receiving reflected ultraviolet light from a light or dark portion of paper 112. In the illustrated embodiment, control board 202 is set to output a control signal when the lens 219 of its fiber optic bundle 200 is receiving light reflected from a light (i.e., an unprinted) portion of paper 112, and not to output any signal when the paper is properly oriented and the lens is receiving light reflected from a dark portion (i.e., from longitudinal strip 14 of printed pattern 8). Similarly, control board 203 is set to output a control signal when its fiber optic lens 209 receives light reflected from a portion of printed pattern 8, but not when the light is reflected from an unprinted portion of paper 112.

Relays 204, 205 are timed relays and sample the outputs from control boards 202, 203 at regular intervals. If the control board is sending a signal at the time it is sampled (i.e., the fiber optics bundle connected to the control board has sensed that paper 112 has shifted from its proper position), the relay passes the signal to the respective one of power relays 206, 207, closing the power relay and causing power to flow from power source 212 to stepping motor 208. AND gate/invertor system 210 insures that a control signal sent by one of control boards 202, 203 will be received by the relay 204, 205 associated with that board, but that no signal will be received by either of relays 204, 205 if for some reason (such as a smudge or other irregularity on paper 112) both of control boards 202, 203 are sending control signals at the same time. This insures that motor 208 will not be powered in opposite directions at the same time.

In the illustrated embodiment, relays 204, 205 are set to sample the outputs of control boards 202, 203 at five (5) second intervals. The length of time that each of power relays 206, 207 remains closed also is adjustable, and in this embodiment is about ¼ second. In other embodiments, in which the paper 212 is advancing at a different speed and/or the step time of motor 208 is different, other times may be used.

Referring now to FIGS. 4 and 10, motor 208 is mounted on a longitudinally-extending plate 252 that also supports both paper reel 104 and guide roll 150. Plate 252 itself is mounted on a pedestal 254 for rotation, about an axis 256 perpendicular to and intermediate the axes of the paper and guide rolls, relative to the pedestal and to the rest of the system 100. A linkage, generally designated 260, is connected to pedestal 254 and, through a reduction gear system, to the drive shaft 269 of motor 208. As shown in FIG. 10 (which is a top view) linkage 260 comprises a fixed arm 262 projecting perpendicularly from one side of pedestal 254, a lever arm 264 fixed to and rotating with motor shaft 269, and a connecting arm 266 pivotally connected at its end to arms 262, 264. The distance from pedestal axis 256 to both the axis of drive shaft 269 and the pivotal connection between arms 262 and 266 is six inches. The distance from the axis of drive shaft 269 to the pivotal connection between arms 264 and 266 is one inch. When plate 252 is centered (i.e., line 268 connecting axis 256 and the axis of motor shaft 269 is perpendicular to arm 262 and parallel to the nominal paper path through system 100), arm 264 forms an angle of 135° with the portion of line 268 extending from motor shaft 269 to pedestal 254, and the axis 151 of guide roll is parallel to arms 262 and perpendicular to the nominal paper path. A spring 259 extends from the end of arm 262 (beyond the point of connection to connecting arm 266) at plate 252 (midway between pedestal 254 and the axis of paper roll 104) to take up any slack in and to bias the linkage 260.

As will be evident from FIGS. 4 and 10, rotation of motor shaft 269 causes plate 252 (and hence line 268 and guide roll axis 151) to rotate about pedestal axis 256. If shaft 269 rotates 30° clockwise (as viewed in FIG. 10), the motor shaft axis moves to point $269_a$ and lines 268 and axis 151 are rotated counterclockwise, to the positions shown by short dashed lines $268_a$ and $151_a$. Similar counterclockwise rotation moves the axis of motor shaft 269 to point $269_b$ and rotates line 268 and axis 151 clockwise to the position shown by long dashed lines $268_b$ and $151_b$.

It should be evident that the displacement of axis 151 resulting from 30° clockwise rotation of motor shaft 269 is greater than that resulting from 30° counterclockwise rotation. The displacement per degree of rotation is affected also by spring 259 and by backlash in the linkage and motor. To insure that the amount of displacement of guide roll 150 resulting from a single sensed control signal (from one of control boards 202, 203) will be the same regardless of direction, the length of time that each power relay 206, 207 stays on is adjusted, the one of the power relays that causes counterclockwise rotation of the motor shaft being set to remain closed slightly longer than is the power relay that causes clockwise rotation of the shaft.

It also will be evident from FIG. 10 that rotation of plate 252 about axis 254 displaces guide roll both longitudinally and transversely relative to the nominal path of paper 112. When the guide roll is displaced to the left (by clockwise rotation of the plate towards line $268b$ and of the guide roll axis towards line $151_b$, as viewed in FIG. 10), the effect is to displace the roll generally axially to the left, and also to move the left end of the roll closer to, and the right end farther away, from pedestal 256, and hence from fixed guide roll 152 and slitter 140. When, as in the illustrated embodiment, the distance from axis 254 to the axis 151 of guide roll 152 is about half the axial length of the roll, the distance the roll moves to the left is about equal to the transverse displacement of each of its ends.

The effect of displacement of guide roll is to shift paper 212 transversely, thereby correcting any misalignment sensed by fiber optic bundles 202, 203. When the guide roll is displaced to the left (as viewed in FIG. 10), the paper 212 similarly is displaced to the left, both directly by virtue of the displacement of the guide roll 152 transverse to the nominal paper path and indirectly because the longitudinal displacement at the right side of the paper has lengthened the effective path of paper passing around the right side of guide roll (which causes more tension to be placed on the right side of the paper 112 than on the left and tends to cause the paper to shift to the left on the guide roll as the paper advances). Displacement of the guide roll to the right similarly moves the paper to the right.

In the illustrated embodiment, linkage 260 is designed so that each rotational step of motor 208 displaces guide roll 152 about 1/32 in. to 1/16 in. axially. This results in a total paper displacement of about 0.020 in. at the point its position is sensed by optical fiber bundles 202, 203 (about half of the total displacement almost immediately because of the axial movement of guide roll 152 and about half within the next few seconds as the paper shifts on the roll to equalize tension), and about 0.002 in. at slitter 140.

FIG. 11 illustrates the spacing frame 154 and brake for copper conductors 122. Typically, the four rolls 110 carrying copper conductors 122 are axially abutted with each other, and the copper conductors 122 thus must be spaced the proper distance apart and aligned with longitudinal stripes 14 of patterns 8 before they are fed into guide 138. Similarly, a drag must be placed on the conductors to insure that they are always under tension.

As shown, frame 154 includes a plurality of guide rolls arranged with their axes of rotation vertical, i.e., perpendicular to the plane of the hose 270 of frame 154. Two guide rolls, one designated 272 and the other designated 274, engage each copper conductor 122. Rolls 272 are positioned so that the inside (i.e., the portion nearest the center of frame 154) of each is tangent to the path of a respective conductor 122 from a supply roll 110. Each roll 274 is positioned so that its outside (i.e., the portion farthest from the center of frame 154) is tangent to a line vertically above and parallel to the longitudinal stripe 14 on which a respective conductor will be superposed. The two conductors 122 or $122b$ on the left side of frame 154 are rotated 90° counterclockwise between rolls 110 and 272, pass around rolls 272 and 274 with their width vertical, and are then rotated 90° counterclockwise after they pass rolls 274 and before passing over guide 158. Similarly, conductors $122c$ and $122d$ are rotated clockwise before engaging rolls 272, and counterclockwise after passing rolls 274.

The brake system comprises a plastic plate 157 screwed tight on top of guide 155, which is a fixed aluminum tube about 2 inches in diameter. The copper conductors 122 pass between plate 157 and guide 155, and friction provides the desired drag or braking force.

OTHER EMBODIMENTS

Other embodiments of the invention may be used to produce heaters of different widths, and may produce either fewer or more than two heaters at a time. For example, the just-described system (with its 12 inch laminator) may be used to make a single heater in which the printed pattern 8 is 10 inches wide, simply by eliminating knife 146, making appropriate changes in guide 138 and slitter 140, and reducing the number of copper conductors. Similarly, the 12 inch laminator system may be used to manufacture at one time three or four so-called "three-inch" heaters in which each printed pattern 8 is 2 7/16 wide. With systems having wider laminators, seven or more "three-inch" heaters may be manufactured simultaneously. In any event, and whatever particular heater construction is being manufactured, slitter 140 will include the cutter sets necessary to cut substrate 112 along lines about 1/32 inch outside each longitudinal stripe 14, guide 138 will position a copper conductor 122 on each longitudinal stripe 14, and (if more than a single heater is being produced) one or more knives 146 will be provided to cut the sealed plastic sheets 123, 124 midway between the adjacent finished heaters.

These and other embodiments will be within the scope of the following claims.

What is claimed is:

1. A system for transversely aligning a substrate moving from a supply roll along a generally longitudinal path, said system comprising:

a first guide roll the axis of which is perpendicular to said path and generally parallel to the desired path of said substrate;

a movable guide roll intermediate said supply roll and said first guide roll, said movable guide roll being mounted such that its axis is rotatable relative to the axis of said first guide roll in a plane parallel to the axis of said first guide roll about an axis of rotation perpendicular to the axis of said first guide roll, a sensor intermediate said movable guide roll and said first guide roll for sensing the transverse position of substrate moving from said movable guide roll towards said first guide roll and producing a signal when the sensed transverse position of said substrate is other than a desired transverse position; and a drive operatively connected to said mounted guide roll for rotating said movable guide roll axis about said axis of rotation in response to a said signal to shift said substrate towards said desired transverse position, said supply roll and said movable guide roll being mounted on a support with the axes thereof parallel to and spaced from each other, and said support being rotatable about said axis of rotation.

2. The system of claim 1 wherein said axis of rotation is intermediate the axes of said supply and movable guide rolls.

3. The system of claim 1 including a stepping motor mounted on said support with the shaft thereof parallel to and spaced from said axis of rotation and including linkage means connecting the shaft of said stepping motor to a point fixed with respect to said axis of rotation and arranged such that said rotation of said stepping motor shaft causes said support to rotate about said axis of rotation.

4. The system of claim 3 wherein said point fixed with respect to said axis of rotation lies on a line extending from said axis of rotation generally perpendicular to said path, and the distance from said axis of rotation to said point is about the same as the distance from said axis of rotation to said stepping motor shift.

5. The system of claim 1 wherein said substrate has printed thereon a pattern including a dark stripe extending longitudinally of said substrate and a light substrate portion adjacent said stripe, and said sensor senses the position of said stripe.

6. The system of claim 5 wherein said sensor includes a pair of optical fiber bundles, and is positioned so that when said substrate is in said desired transverse position the end of one of said bundles overlies and receives light reflected from said dark stripe, the end of the other of said bundles is closely adjacent but overlies and receives light reflected from said adjacent light substrate position, and each of said bundles has associated therewith a control circuit arranged to produce a said signal when the said bundle receives light reflected from the one of said dark stripe and said light substrate portion other than the one thereof from which the said bundle receives light when said substrate is in said desired transverse position.

7. The system of claim 6 including a stepping motor the shaft of which is arranged to rotate said movable guide roll axis in response to rotation of said shaft and means for sensing the outputs of said control circuits at predetermined intervals and causing said shaft of said motor to rotate if a said circuit is producing a said signal when said output thereof is sensed.

8. The system of claim 7 including means for insuring that said shaft of said motor does not rotate if both of said circuits are producing a said signal.

* * * * *